Nov. 1, 1927.  
R. EISENBERG ET AL  
1,647,514  
COMBINED ANIMAL SCARF AND VANITY CONTAINER  
Filed March 27, 1925
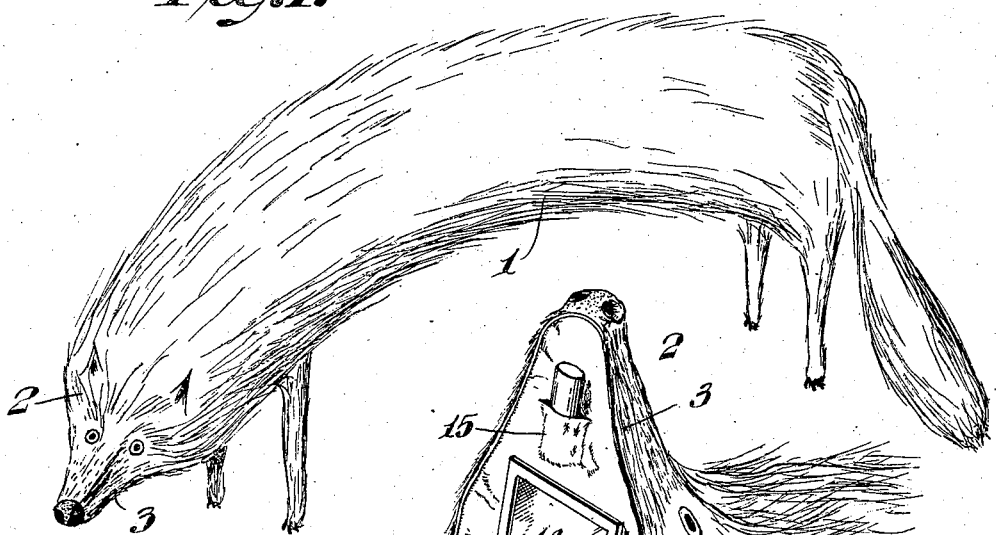
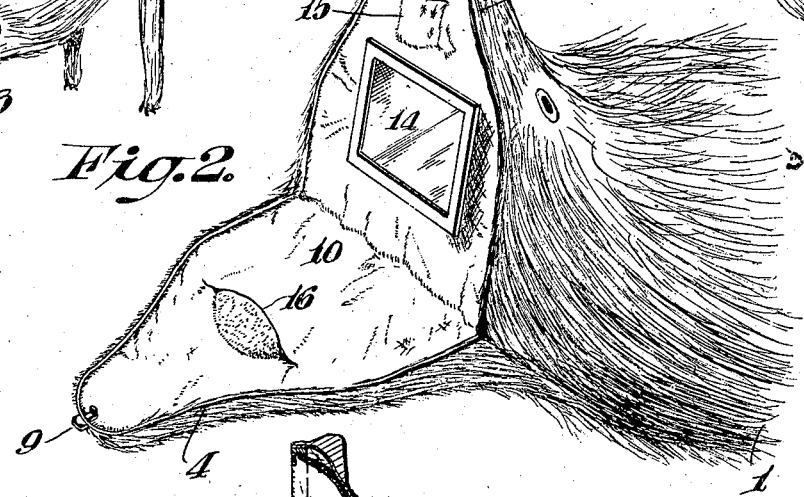
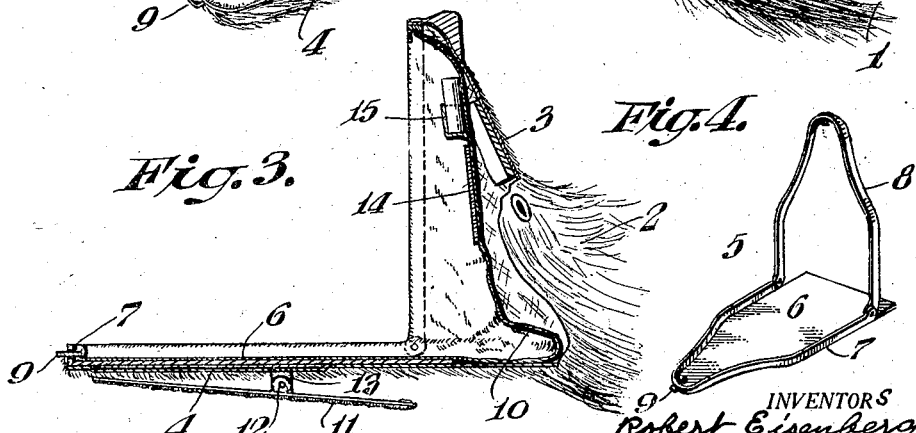
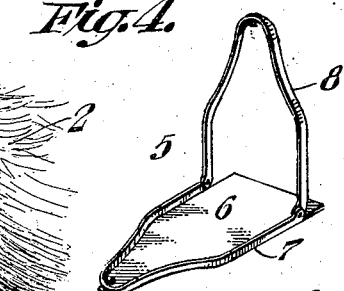
INVENTORS  
Robert Eisenberg  
Hugo A. Siefert  
BY  
J. Bonsall Taylor  
Herbert S. Fairbanks  
ATTORNEYS.

Patented Nov. 1, 1927.

1,647,514

UNITED STATES PATENT OFFICE.

ROBERT EISENBERG AND HUGO A. SIEFERT, OF PHILADELPHIA, PENNSYLVANIA.

COMBINED ANIMAL SCARF AND VANITY CONTAINER.

Application filed March 27, 1925. Serial No. 18,676.

The object of our invention is to devise a novel combined animal scarf and vanity container, wherein the head of the animal scarf has concealed within it an accessible chamber which can serve as a container for vanity appliances and as a pocket for a purse or any other desired articles which it is desired to conceal within the head of the animal scarf.

With the above and other objects in view, as will be hereinafter set forth, our invention comprehends a novel construction and arrangement of a combined animal scarf and pocket, wherein the head has concealed therein an accessible chamber being provided with a suitable closure which can be locked in its closed position.

It further comprehends a novel construction of a fur animal scarf and container which latter is located within the head and which is accessible to the user when the jaws of the head are opened and wherein, when the jaws are closed, the fur of the head will present the same appearance as if it were a head with fixed jaws.

Other novel features of construction and advantage will hereinafter more clearly appear in the detailed description and the appended claims.

For the purpose of illustrating the invention, we have shown in the accompanying drawing a typical embodiment of it, which, in practice, will give reliable and satisfactory results. It is, however, to be understood that this embodiment is typical only and that the various instrumentalities of which our invention consists can be variously arranged and organized, and that the invention is not, therefore limited to the precise arrangement and organization of these instrumentalities as herein set forth.

Figure 1 is an elevation of a combined animal scarf and vanity container embodying our invention.

Figure 2 is a perspective view showing the jaws of the head in their open position.

Figure 3 is a sectional elevation of the head.

Figure 4 is a perspective view of the frame of the container.

Similar numerals of reference illustrate corresponding parts.

Referring to the drawings:

1 designates a combined vanity scarf and vanity container, embodying our invention. The scarf is provided in the usual manner with a head 2 and this head is formed in such a manner that relatively movable jaws 3 and 4 are provided.

5 designates the frame which consists of a base board or plate 6 to which is connected a preferably metal strip 8.

The contour of the frame is such that it will fit within the jaws of the head of the animal skin and be secured thereto by stitching or any other desired fastening devices.

One of the frame members, for example the frame member 7, is provided with a slidable catch 9 which will overhang the frame 8, and secure the jaws in their closed position.

10 designates a pocket forming lining the arrangement of which will be clearly understood from Figure 3.

In order that the scarf may be secured around the neck of the wearer, we provide a fastening device which, as illustrated, consists of a spring clasp 11 pivotally connected at 12, to a bracket 13, which is secured to the base plate 6. The pocket formed by the lining 10 within the jaws may be employed to contain any desired articles, and, for purpose of illustration, we have shown it as being provided with a mirror 14, preferably located on the upper jaw side of the head, and also with a pocket 15 to contain a lip stick and a pocket 16 to contain a powder puff and its adjuncts.

It will of course be understood that the pocket can extend to any desired degree into the body of the scarf.

The fur covers both the upper and the lower jaws so that the pocket will be entirely concealed within the head when the jaws are closed.

The base plate may be of wood, metal or other desired material and with the frame members serves to reinforce the head without changing its external appearance.

It will now be apparent that we have devised a new and useful combined animal scarf and vanity container, which embodies the features of advantage enumerated as desirable in the statement of the invention and the above description, and that while we have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described our invention, what we claim as new and desire to secure by Letters Patent, is:

1. The combination with an animal scarf having a head provided with an upper and a lower jaw, of a pocket book frame comprising hinged sections, one of said sections being secured within said upper jaw and the other of said sections being secured within said lower jaw, a lining for said sections forming with them a pocket book, and means to secure the free ends of the animal scarf together without opening said pocket book.

2. The combination with an animal scarf having a head provided with an upper and a lower jaw, of a pocket book frame comprising hinged sections, one of said sections being secured within said upper jaw and the other of said sections being secured within said lower jaw, and a lining for said sections forming a pocket, the sides of which are closed by the frame when the jaws are closed, said lining having means to retain vanity appliance, and means to retain said jaws in their closed position.

3. The combination with an animal scarf having a head provided with an upper and a lower jaw, of a pocket book frame comprising hinged sections, one of said sections being secured within said upper jaw and the other of said sections being secured within said lower jaw, a lining for said sections forming with them a pocket book, and a clamping device carried by and exterior of the lower jaw to secure the ends of the scarf together without opening the pocket book.

ROBERT EISENBERG.
HUGO A. SIEFERT.